United States Patent [19]

Kuntz

[11] Patent Number: 4,958,676

[45] Date of Patent: Sep. 25, 1990

[54] DIE CASTING APPARATUS FOR CASTING ARTICLES WITH AN INTERNALLY THREADED BORE

[75] Inventor: Robert J. Kuntz, Macungie, Pa.

[73] Assignee: Hubbell Incorporated, Orange, Conn.

[21] Appl. No.: 358,071

[22] Filed: May 30, 1989

[51] Int. Cl.$^5$ ............................................. B22D 17/24
[52] U.S. Cl. ................................... 164/340; 164/132; 164/345; 249/59; 249/63; 425/438; 425/577
[58] Field of Search ........................ 164/131, 132–137, 164/340, 342, 343, 344, 345, 346; 249/59, 63; 425/438, 577

[56] References Cited

U.S. PATENT DOCUMENTS

| | | | |
|---|---|---|---|
| 2,579,952 | 12/1951 | Morin | 164/132 |
| 3,388,431 | 6/1968 | Aoki | 249/59 |
| 3,856,255 | 12/1974 | Holzmann | 249/59 |
| 3,905,416 | 9/1975 | Hammer | 164/132 |
| 4,079,475 | 3/1978 | Thompson | 164/131 |
| 4,240,498 | 12/1980 | Frenette | 164/340 |
| 4,280,549 | 7/1981 | Gibbs | 164/131 |
| 4,554,962 | 11/1985 | Wright | 164/132 |
| 4,633,932 | 1/1987 | Ferguson | 164/131 |

FOREIGN PATENT DOCUMENTS

| | | | |
|---|---|---|---|
| 983666 | 2/1976 | Canada. | |
| 47-16550 | 5/1972 | Japan | 249/59 |
| 458387 | 3/1975 | U.S.S.R. | 164/345 |

Primary Examiner—Richard K. Seidel
Attorney, Agent, or Firm—Jerry M. Presson; Alfred N. Goodman

[57] ABSTRACT

A die casting apparatus for casting an article with an internally screw-threaded bore. The die casting apparatus includes a support, a die assembly coupled to the support, a core pin with external threads which are movable into and out of the die assembly, a lead screw for moving the core pin, a fixed bushing threadedly receiving the lead screw therein, a drive assembly, and a control assembly. The drive assembly has a hydraulic motor with an ouptut shaft that is axially arranged relative to the core pin for smoothly driving the core pin and lead screw. The external threads of the core pin and the external thread of the lead screw are identical for driving the core pin and the lead screw at the same rate to avoid damaging the newly formed internal threads of the cast article.

16 Claims, 2 Drawing Sheets

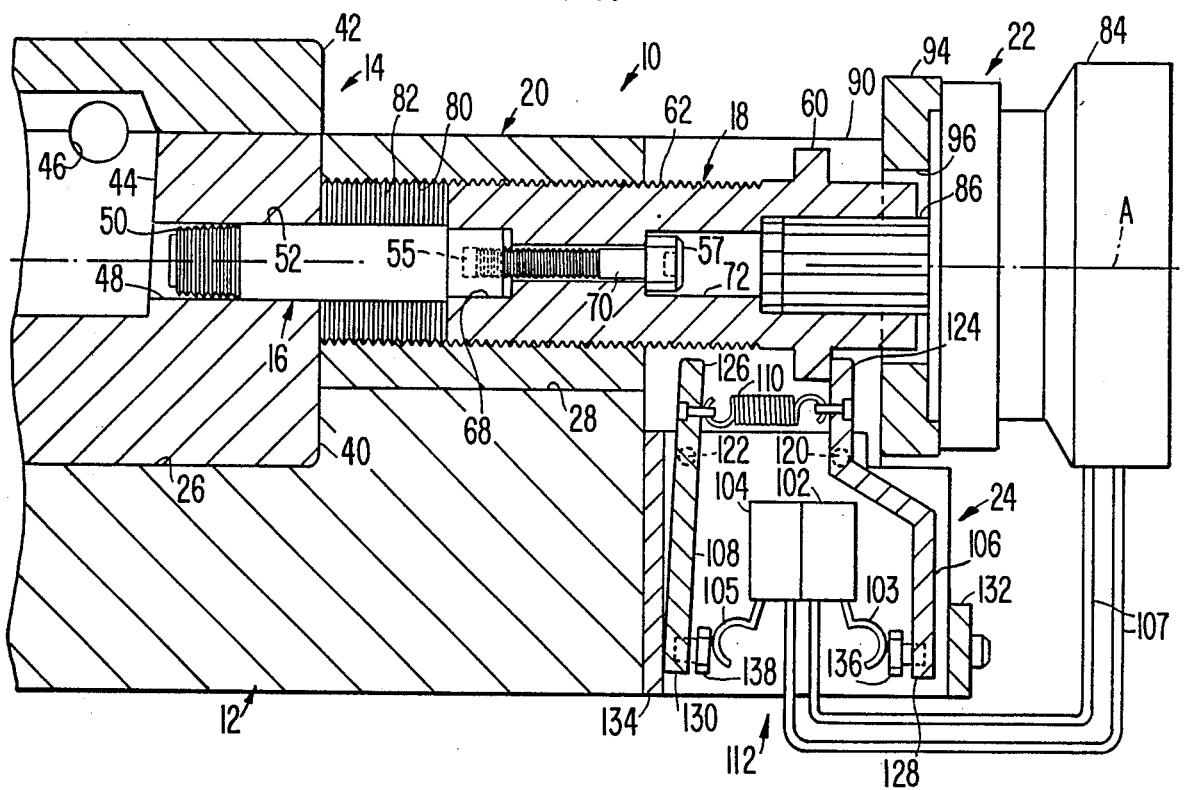

DIE CASTING APPARATUS FOR CASTING ARTICLES WITH AN INTERNALLY THREADED BORE

FIELD OF THE INVENTION

This invention relates to a die casting apparatus for casting articles having an internally threaded bore. More specifically, this invention relates to a die casting apparatus having a support, a die assembly, a threaded core pin with a predetermined pitch, a fixed bushing, a lead screw coupled to the core pin and threadedly received in the bushing, a drive assembly, and a control assembly The lead screw has external threads thereon with the identical pitch as the pitch of the external threads on the core pin so that the core pin is driven out of the mold without damaging the newly formed threads.

BACKGROUND OF THE INVENTION

In the past, to form a cast or molded article with internal threads, the article would be cast with a hole which was then tapped using a tool to cut the internal threads in the hole. Accordingly, this process required two steps, which meant more time and labor to produce an article with internal threads.

This led to the development of numerous die casting machines for casting an article with an internally screw-threaded bore in a single step. There are, however, several disadvantages to many of these die casting machines employed by the prior art. For example, many of the drive mechanisms merely rotated the core pin so that the newly formed threads would drive the core pin out of the mold. Accordingly, this type of an arrangement places great stress on the newly formed threads, and thus may cause the threads to be damaged while withdrawing the core pin. Moreover, many of the drive mechanisms of the prior art are quite complex, using hydraulic pistons, many gears and other parts.

Examples of these prior art devices are disclosed in U.S. Pat. Nos. 2,579,952 to Morin; 3,905,416 to Hammer; 4,079,475 to Thompson; 4,240,498 to Frenette; 4,280,549 to Gibbs; 4,554,962 to Wright; and 4,633,932 to Ferguson. A further example is disclosed in Canadian patent No. 983,666.

In view of the above, it is apparent that there exists a need for a way to remove the core pin without damaging the newly formed internal threads. Accordingly, this invention addresses this need in the art, along with other needs which will become apparent to those skilled in the art once given this disclosure.

SUMMARY OF THE INVENTION

Accordingly, a primary object of the invention is to provide a die casting apparatus for casting an article with an internally screw-threaded bore.

Another object of the invention is to provide a die casting apparatus with a drive mechanism for removing the core pin from the molded article without damaging the newly formed internal threads on the molded article.

Another object of the invention is to provide a die casting apparatus with drive mechanism that is easy to manufacture and assemble.

Yet another object of the invention is to provide a die casting apparatus having a drive motor with an output shaft coupled axially and directly to the lead screw and the core pin.

Still another object of the invention is to provide a die casting apparatus having a control assembly for accurately controlling the insertion and retraction of the core pin into the die cavity.

The foregoing objects are basically attained by a die casting apparatus for casting an article with an internally screw-threaded bore, comprising: a support; a die, coupled to the support, having a first opening, a second opening and a cavity therein for receiving die casting material through the first opening; a core pin having first and second ends, the first end having external threads with a predetermined pitch thereon, the core pin being slidably coupled to the die for axial movement of the first end of the core pin into and out of the cavity via the second opening; and a driving mechanism, coupled to the support and the core pin, for rotating and for moving the core pin into and out of the cavity, the drive mechanism including a movable member fixedly coupled to the core pin for axial movement therewith and having a first set of threads with a pitch identical to the pitch of the core pin threads, a stationary member having a second set of threads with a pitch identical to the pitch of the core pin threads and threadedly engaged with the first set of threads, and a power device, coupled to the movable member for rotating the movable member and the core pin relative to the stationary member and for moving the core pin into and out of the cavity.

Other objects, advantages, and salient features of the invention will become apparent from the following detailed description, which, taken in conjunction with the annexed drawings, discloses a preferred embodiment of the invention.

BRIEF DESCRIPTION OF THE DRAWINGS

Referring to the drawings which form a part of this original disclosure:

FIG. 1 is a longitudinal cross-sectional view in side elevation of a die casting apparatus with the core pin fully retracted from the cavity in the mold in accordance with the present invention;

FIG. 2 is a longitudinal cross-sectional view in side elevation of the die casting apparatus of FIG. 1 with the core pin fully extended into the cavity of the mold in accordance with the present invention;

DETAILED DESCRIPTION OF THE INVENTION

Figure 3:
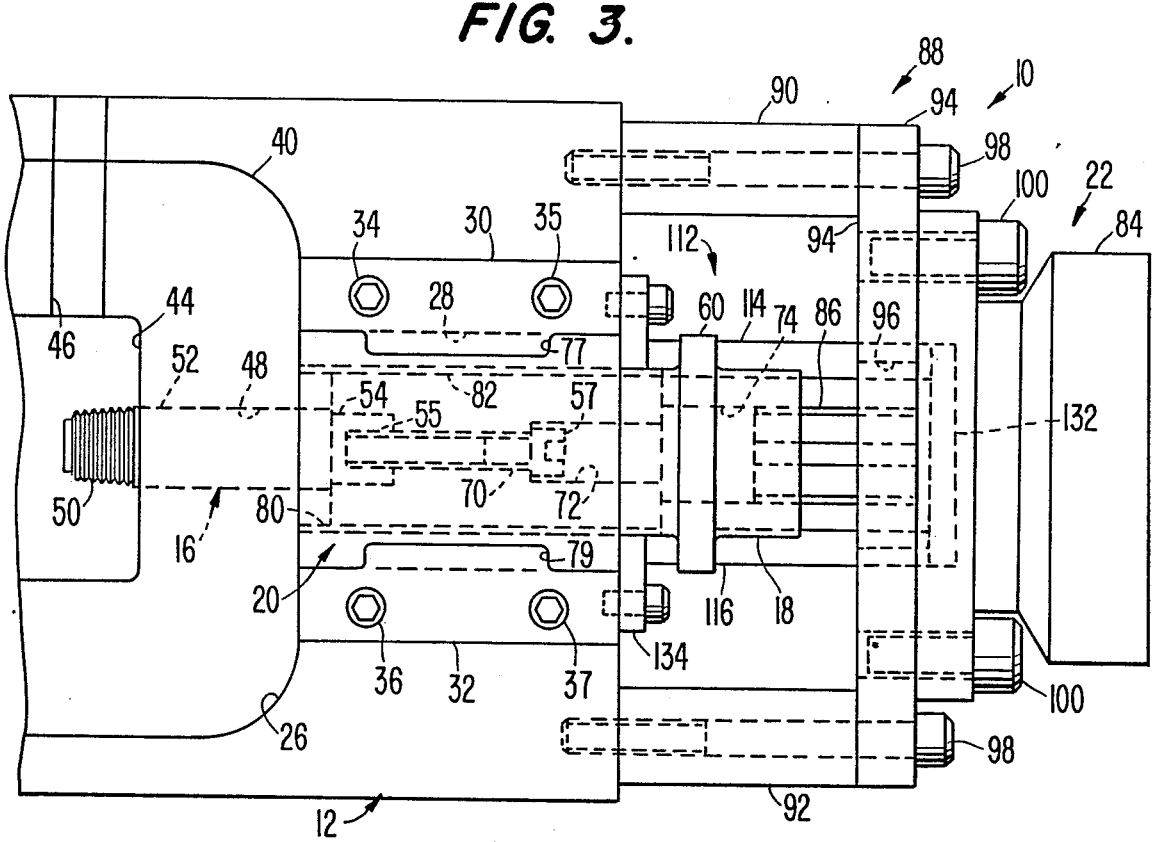
FIG. 3 is a top plan view of the die casting apparatus shown in FIG. 2 with a part of the mold removed.

As seen in FIGS. 1–3, the die casting apparatus 10 in accordance with the present invention includes a rigid and fixed support 12, a die assembly 14 coupled to the support, a core pin 16 movable into and out of the die assembly, a lead screw 18 for moving the core pin, a fixed bushing 20 threadedly receiving the lead screw therein, a drive assembly 22, and a control assembly 24.

As described in more detail hereinafter, the lead screw 18 has external threads thereon with the identical pitch as the pitch of the external threads on the core pin, so that the core pin is driven out of the die assembly without damaging the newly formed threads.

Support 12 is preferably a steel frame member, such as a 12×15 D.M.E. holder. Support 12 includes a recess 26 for receiving and supporting die assembly 14 therein and a recess 28 for receiving and supporting bushing 20 therein. Die assembly 14 is coupled in recess 26 in a conventional manner. Bushing 20 is fixedly coupled in recess 28 by a pair of mounting brackets 30 and 32 which are coupled to support 12 by bolts 34–37 as particularly seen in FIG. 3.

Die assembly 14 includes a stationary mold member 40 and a movable mold member 42 that form a conventional molding cavity 44 therebetween as seen in FIGS. 1 and 2. Movable mold member 42 is moved by any conventional device. Cavity 44 has a pair of cylindrical openings 46 and 48 extending therein. Opening 46 is formed between stationary mold member 40 and movable mold member 42, and permits the injection of casting material into cavity 44. Preferably, the casting material is a hot liquid aluminum alloy, although any suitable hot liquid casting material may be utilized.

Second opening 48 extends through stationary mold member 40 for slidably receiving core pin 16 therein. Opening 48 has a diameter tightly but slidably receiving core pin 16 therein to prevent the casting material from flowing out of cavity 44 through opening 48.

Figure 4:
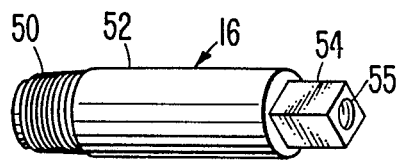
FIG. 4 is a left perspective view of the core pin shown in FIGS. 1–3.
Figure 5:
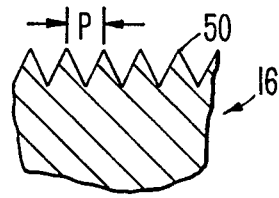
FIG. 5 is an enlarged, fragmentary, longitudinal cross-sectional view in elevation of the external threads of the core pin shown in FIG. 4.
Figure 6:
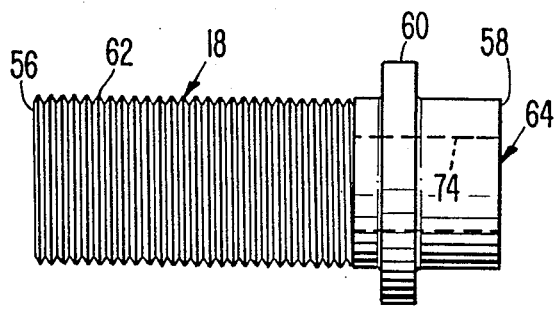
FIG. 6 is a side elevational view of the lead screw shown in FIGS. 1–3.
Figure 7:
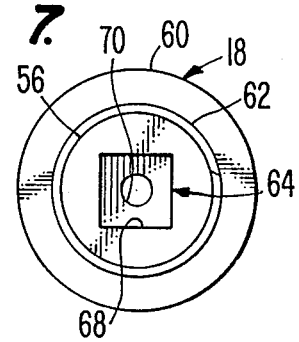
FIG. 7 is a left end elevational view of the lead screw shown in FIG. 6.
Figure 8:
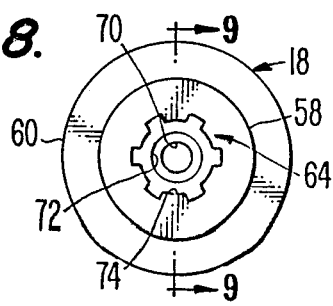
FIG. 8 is a right end elevational view of the lead screw shown in FIG. 6.

As particularly seen in FIG. 4, core pin 16 has an externally threaded first end 50, a cylindrical intermediate portion 52, and a shaft 54 with a rectangular cross section extending axially from portion 52 as the second end of core pin 16. Threads 50 of core pin 16 have a predetermined pitch P as seen in FIG. 5 and form the internal threads on the article being cast. The pitch is defined as the number of threads per inch, and thus determines the amount of axial movement of core pin 16 relative to the cast article with each rotation of core pin 16 when being retracted. Cylindrical intermediate portion 52 is slidably received in opening 48 and has a diameter slightly smaller than the diameter of opening 48 to prevent the casting material from flowing out of cavity 44 between opening 48 and intermediate portion 52. Shaft 54 has a threaded axial bore 55 for coupling core pin 16 to lead screw 18 via bolt 57 as seen in FIGS. 1 and 2. Core pin 16 is preferably formed of Uddeholm H-13 tool steel that is heat treated to a Rockwell hardness of about 46–48RC and has a process coating to aid in releasing core pin 16 from the cast article.

Referring to FIGS. 6–9, lead screw 18 is generally cylindrical in shape and includes a first end 56, a second end 58, an annular flange 60, external threads 62, and a multi-shaped throughbore 64 extending axially between first end 56 and second end 58. Lead screw 18 is preferably made of bronze. External threads 62 have a predetermined pitch that is identical to the pitch P of core pin 16 and extends approximately two-thirds the length of lead screw 18 from its first end 56.

Figure 9:
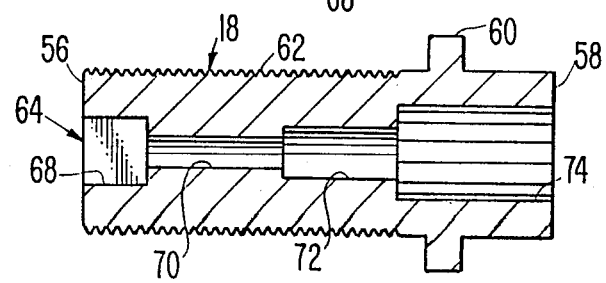
FIG. 9 is a longitudinal cross-sectional view in side elevation of the lead screw taken along line 9—9 in FIG. 8.

As particularly seen in FIG. 9, multi-shaped bore 64 includes a rectangular bore portion 68, a first cylindrical bore portion 70, a second cylindrical bore portion 72 and a spline bore portion 74. Rectangular bore portion 68 is slightly larger than rectangular shaft 54 of core pin 16 for receiving it therein. Since rectangular bore portion 68 and shaft 54 have a rectangular cross sections, core pin 16 will not rotate relative to lead screw 18. The cross section of shaft 54 and the periphery of bore portion 68 can have any non-circular shape to prevent rotation therebetween Core pin 16 is removably secured to lead screw 18 by bolt 57 as seen in FIGS. 1–3 which is received in bores 70 and 72 of lead screw 18 and threadedly received in threaded bore 55 of core pin 16. More particularly, the shaft of bolt 57 is received in first cylindrical bore portion 70 and the head of bolt 57 is received in second cylindrical bore portion 72. Spline bore portion 74 is axially splined to receive a six spline shaft 86 therein for rotating lead screw 18.

Bushing 20 is preferably made of bronze or some other suitable high temperature metal and is rigidly coupled to support 12. Bushing 20 has a generally rectangular outer transverse cross section for being non-rotatably received in recess 28 of support 12, and a pair of recesses 77 and 79 for receiving a portion of brackets 30 and 32 to prevent axial movement of bushing 20 as particularly seen in FIG. 3. Bushing 20, as seen in FIGS. 1 and 2, has an internally threaded cylindrical bore 80 for threadedly receiving lead screw 18 therein. Threads 82 of internally threaded bore 80 have a pitch identical to pitch P of core pin 16 and the pitch of the threads 62 of lead screw 18.

Drive train assembly 22 includes a reversible hydraulic motor 84 having a six-spline output shaft 86. Hydraulic motor 84 should be capable of producing 1,000 psi to rotate output shaft 86 at about 120 to about 140 rpms and has an output of 200 foot pounds of torque.

Hydraulic motor 84 is fixedly coupled to support 12 by a bracket assembly 88 as particularly seen in FIG. 3. Bracket assembly 88 includes a pair of side spacers 90 and 92, and a transverse wall 94 having an opening 96 therein for receiving output shaft 86 therethrough. Bracket assembly 88 is coupled to support 12 by a plurality of bolts 98 (only two shown). Hydraulic motor 84 is bolted to transverse wall 94 with output shaft 86 extending through opening 96 by a pair of bolts 100.

Output shaft 86 is slidably received in spline bore portion 74 of lead screw 18 for rotating lead screw 18 therewith. Accordingly, as lead screw 18 is rotated, its external threads 62 will engage threads 82 of bushing 20, causing lead screw 18 to move axially along output shaft 86. This axial movement is called the stroke, which is about 1 inch in the embodiment illustrated.

As seen in FIGS. 1–3, core pin 16, lead screw 18, bushing 20 and output shaft 86 are all arranged axially along axis A to provide smooth movement of core pin 16 into and out of cavity 44.

Control assembly 24, as seen in FIGS. 1–3, includes a pair of micro-switches 102 and 104, a first multiplying link 106, a second multiplying link 108, a spring 110 and a support bracket 112.

Micro-switches 102 and 104 have movable contacts 103 and 105, respectively, that are selectively engaged by multiplying links 106 and 108 for turning hydraulic motor 84 on or off via wires 107 to control the stroke of core pin 16 into and out of cavity 44. Accordingly, micro-switch 102 forms a rearward limit switch and controls the retraction of core pin 16, while micro-switch 104 forms a forward limit switch and controls the insertion of core pin 16.

Support bracket 112 includes a pair of side wall members 114 and 116 for pivotally supporting first and second multiplying links 106 and 108 therebetween by pins 120 and 122, and a pair of end walls 132 and 134.

Multiplying links 106 and 108 have first ends 124 and 126, and second ends 128 and 130, respectively. First ends 124 and 126 are coupled together by spring 110 for biasing second ends 128 and 130 away from contacts 103 and 105 of micro-switches 102 and 104, respectively, and against walls 132 and 134 of support bracket 112. Pivot pins 120 and 122 are located closer to first ends 124 and 126 than to second ends 128 and 130 so that a slight movement at the first end of the link will cause its second end to move about three times as much. Second ends 128 and 130 are provided with adjustment screws 136 and 138 for adjusting the stroke of core pin 16 into and out of cavity 44.

As seen in FIG. 1, flange 60 of lead screw 18 will contact first multiplying link 106 when core pin 16 is in the fully retracted position to trigger microswitch 102 to turn off hydraulic motor 84. When core pin 16 is fully extended into cavity 44 as seen in FIG. 2, flange 60 of lead screw 18 will contact second multiplying link 108 to trigger the micro-switch 104 to stop hydraulic motor 84. Suitable conventional controls, not shown, are used to actuate motor 84 in the proper timed sequence after either of micro-switches 102 and 104 are activated.

Also, if desired, a coupling/clutch could be installed between output shaft 86 and lead screw 18 to avoid damaging hydraulic motor 84 and other parts of die casting apparatus 10 should core pin 16 become stuck.

In operation, with movable mold member 42 in the closed position of FIG. 1, output shaft 86 of hydraulic motor 84 is rotated to in turn rotate lead screw 18 and core pin 16 relative to fixed bushing 20 to move core pin 16 axially into the cavity 44. The molten casting material is injected into cavity 44 through opening 46, and the internal threads of the article are formed about core pin 16. Once the injected casting material has cooled, output shaft 86 of hydraulic motor 84 is rotated in the opposite direction, which rotates lead screw 18 and core pin 16 relative to fixed bushing 20 in the opposite direction, thereby axially moving core pin 16 out of cavity 44 without destroying the threads formed in the molded part. Core pin 16 can be removed from the molded article without destroying the newly formed internal threads because the pitch of lead screw 18, fixed bushing 20, and core pin 16 are identical. Accordingly, lead screw 18 and core pin 16 move axially at the exact same rate relative to bushing 20 and newly formed threads of the cast article, respectively. After the core pin 16 is removed from cavity 44, movable member 42 is moved away from the cavity and the newly cast article can be removed from the cavity.

While only one embodiment has been chosen to illustrate the invention, it will be understood by those skilled in the art that various changes and modifications can be made herein without departing from the scope of the invention as defined in the appended claims.

What is claimed is:

1. A die casting apparatus for casting an article with an internally screw-threaded bore, comprising:
    a support;
    a die, coupled to said support, having a first opening, a second opening and a cavity therein for receiving casting material through said first opening;
    a core pin having first and second ends, said first end having external threads with a predetermined pitch thereon, said core pin being slidably coupled to said die for axial movement of said first end of said core pin into and out of said cavity via said second opening; and
    driving means, coupled to said support and said core pin, for rotating and for axially moving said core pin into and out of said cavity, said driving means including
        a movable member fixedly coupled to said core pin for simultaneous rotational and axial movement in the same direction therewith and having a first set of threads with a pitch identical to said pitch of said core pin threads,
        a stationary member, fixedly coupled to said support, having a second set of threads with a pitch identical to said pitch of said core pin threads and threadedly engaged with said first set of threads, and
        power means, coupled to said movable member, for rotating said movable member and said core pin relative to said stationary member and for axially moving said core pin into and out of said cavity, said power means having an output shaft axially aligned with said movable member and said core pin.

2. A die casting apparatus according to claim 1, wherein
    said power means includes a motor having an output shaft axially aligned with and directly coupled to said movable member.

3. A die casting apparatus according to claim 2, wherein
    said motor is hydraulically driven.

4. A die casting apparatus according to claim 2, wherein
    said movable member has an axially extending bore with an internal surface for slidably receiving said output shaft therein.

5. A die casting apparatus according to claim 1, wherein
    said movable member has a non-circular bore extending axially inwardly from one of its ends for non-rotatably receiving said second end of said core pin.

6. A die casting apparatus according to claim 1, further comprising
    control means, coupled to said support, for limiting axial movement of said core pin into and out of said cavity.

7. A die casting apparatus according to claim 6, wherein
    said control means includes a forward limit switch which engages a portion of said movable member to limit forward movement of said core pin into said cavity, and a rearward limit switch which engages a portion of said movable member to limit rearward movement of said core pin.

8. A die casting apparatus according to claim 6, wherein
    said control means includes a forward switch assembly having a first link, pivotally coupled to said support, with a first end and a second end, said first end of said first link engaging said movable member and said second end of said first link engaging a forward limit switch to stop said core pin from moving into said cavity, and
    a rearward switch assembly having a second link, pivotally coupled to said support, with a first end and a second end, said first end of said second link engaging said movable member and said second end of said second link engaging a rearward limit switch to stop said core pin from moving out of said cavity.

9. A die casting apparatus for casting an article with an internally screw-threaded bore, comprising:
a support;
a die, coupled to said support, having a first opening, a second opening and a cavity therein for receiving casting material through said first opening;
a core pin having first and second ends, said first end having external threads with a predetermined pitch thereon, said core pin being slidably coupled to said die for simultaneous rotational and axial movement of said first end of said core pin into and out of said cavity via second opening;
a lead screw fixedly couple to an axially aligned with said core pin for axial movement in the same direction therewith and having external threads with a pitch identical to said pitch of said core pin threads;
a bushing fixedly coupled to said support and having a bore extending axially therethrough with internal threads with a pitch identical to said pitch of said core pin threads, said external threads of said lead screw being threadedly engaged with said internal threads of said bushing; and
a motor having an output shaft slidably coupled directly to and axially aligned with said lead screw for rotating said lead screw and said core pin relative to said bushing and for axially moving said core pin into and out of said cavity.

10. A die casting apparatus according to claim 9, wherein
said motor is hydraulically driven.

11. A die casting apparatus according to claim 9, wherein
said lead screw has an axially extending bore with an internal surface for slidably receiving said output shaft therein.

12. A die casting apparatus according to claim 9, wherein
said lead screw has a non-circular bore extending axially inwardly from one of its ends for non-rotatably receiving said second end of said core pin.

13. A die casting apparatus according to claim 9, further comprising
control means, coupled to said support, for limiting axial movement of said core pin into and out of said cavity.

14. A die casting apparatus according to claim 13, wherein
said control means includes a forward limit switch which engages a portion of said movable member to limit forward movement of said core pin into said cavity, and a rearward limit switch which engages a portion of said lead screw to limit rearward movement of said core pin.

15. A die casting apparatus according to claim 13, wherein
said control means includes a forward switch assembly having a first link, pivotally coupled to said support, with a first end and a second end, said first end of said first link engaging said lead screw and said second end of said first link engaging a forward limit switch to stop said core pin from moving into said cavity, and
a rearward switch assembly having a second link, pivotally coupled to said support, with a first end and a second end, said first end of said second link engaging said lead screw and said second end of said second link engaging a rearward limit switch to stop said core pin from moving out of said cavity.

16. A die casting apparatus for casting an article with an internally screw-threaded bore, comprising:
a support;
a die, coupled to said support, having a first opening, a second opening and a cavity therein for receiving casting material through said first opening;
a core pin having first and second ends, said first end having external threads with a predetermined pitch thereon, said core pin being slidably coupled to said die for axial movement of said first end of said core pin into and out of said cavity via said second opening;
driving means, coupled to said support and said core pin, for rotating and for moving aid core pin into and out of said cavity, said driving means including
a movable member fixedly coupled to said core pin for axial movement therewith and having a first set of threads with a pitch identical to said pitch of said core pin threads,
a stationary member having a second set of threads with a pitch identical to said pitch of said core pin threads and threadedly engaged with said first set of threads, and
power means, coupled to said movable member, for rotating said movable member and said core pin relative to said stationary member and for moving said core pin into and out of said cavity; and
control means, coupled to said support, for limiting axial movement of said core pin into and out of said cavity, said control means including
a forward limit switch and a rearward limit switch, both rigidly coupled to said support,
a forward switch assembly having a first link, pivotally coupled to said support, with a first end and a second end,
said first end of said first link engagable with said movable member and said second end of said first link engagable with said forward limit switch to limit the movement of said core pin relative to said cavity, and
a rearward switch assembly having a second link pivotally couple to said support, with a first end and a second end, said first end of said second link engagable with said movable member and said second end of said second link engagable with said rearward limit switch to limit the movement of said core pin relative to said cavity.

* * * * *